United States Patent [19]

Nozawa

[11] Patent Number: 5,825,676
[45] Date of Patent: *Oct. 20, 1998

[54] ORTHOGONAL CONVERTING APPARATUS

[75] Inventor: Shingo Nozawa, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 534,886

[22] Filed: Sep. 27, 1995

[30] Foreign Application Priority Data

Sep. 30, 1994 [JP] Japan .................................. 6-237901
Sep. 30, 1994 [JP] Japan .................................. 6-237902
Sep. 30, 1994 [JP] Japan .................................. 6-237903

[51] Int. Cl.[6] ........................................................ G06F 17/14
[52] U.S. Cl. ........................................................ 364/725.02
[58] Field of Search .............................. 364/725, 725.02

[56] References Cited

U.S. PATENT DOCUMENTS 5,181,183  1/1993  Miyazaki ............................. 364/725
5,590,066  12/1996  Ohki ..................................... 364/725

FOREIGN PATENT DOCUMENTS 2-116969  5/1990  Japan .

*Primary Examiner*—Tan V. Mai
*Attorney, Agent, or Firm*—Fitzpatrick, Cella, Harper & Scinto

[57] ABSTRACT

An orthogonal converting apparatus is constructed by an addition-subtraction operation circuit for calculating the addition and difference between two signal trains each consisting of n ($n \geq 1$) signals, two multiplication-addition operation circuits each for calculating multiplication-addition of the (n) signals, a transposition circuit for permutating ($2n \times 2n$) signals arranged in the horizontal and vertical directions and a control circuit for controlling an operation of each of the above-mentioned circuits, wherein the control circuit executes the following processes by controlling the operations of the above-mentioned circuits: a first encoding process for executing a 2-dimensional orthogonal converting process to the ($2n \times 2n$) input signals a first decoding process corresponding to the first encoding process a second encoding process for dividing the ($2n \times 2n$) input signals into ($n \times 2n$) signals each corresponding to an addition of adjacent lines and, likewise ($n \times 2n$) signals each corresponding to a subtraction of adjacent lines and for performing the 2-dimensional orthogonal converting process and a second decoding process corresponding to the second encoding process.

10 Claims, 13 Drawing Sheets

FIG. 9

| MODE | DCT | | IDCT | |
|---|---|---|---|---|
| CYCLE | 1ST | 2ND | 1ST | 2ND |
| SW1 | a-c | | b-c | |
| SW2 | a-c | | b-c | |
| SW3 | | a-c | | b-c |
| SW4 | | a-c | | b-c |
| SW5 | a-c | | b-c | |
| SW6 | b-c | | a-c | |
| SW7 | a-A<br>b-B<br>c-C<br>d-D | e-A<br>h-B<br>g-C<br>f-D | a-A<br>b-B<br>c-C<br>d-D | e-A<br>f-B<br>g-C<br>h-D |
| SW8 | e-A<br>f-B<br>g-C<br>h-D | a-A<br>b-B<br>c-C<br>d-D | e-A<br>h-B<br>g-C<br>f-D | a-A<br>b-B<br>c-C<br>d-D |

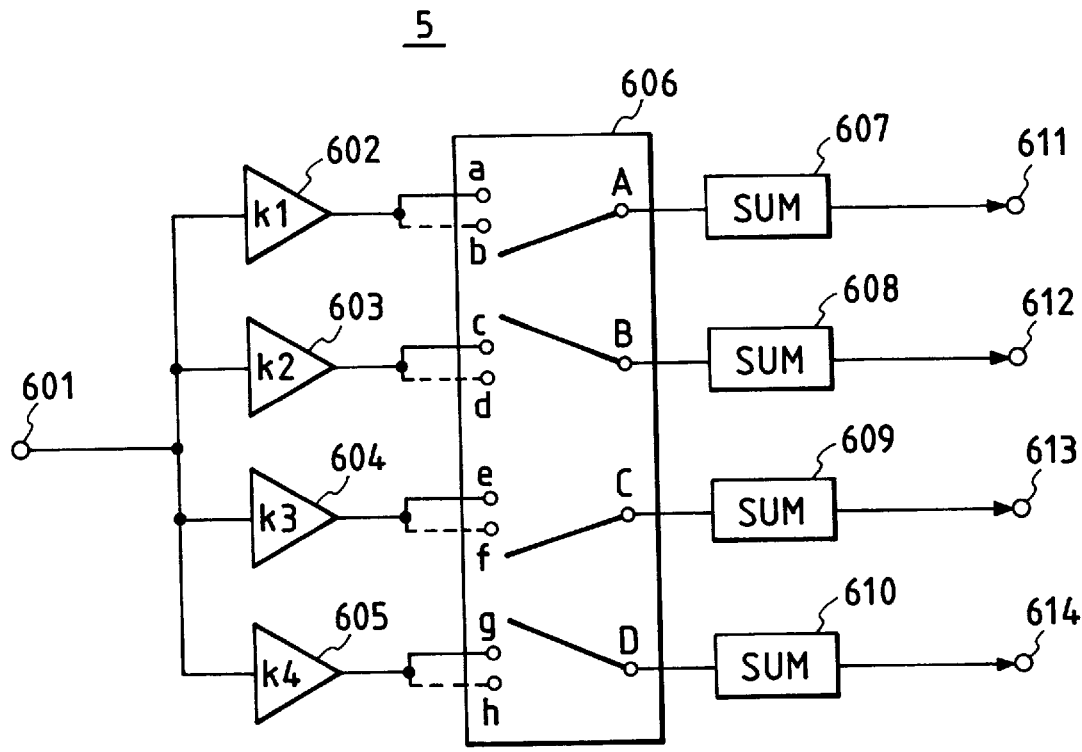

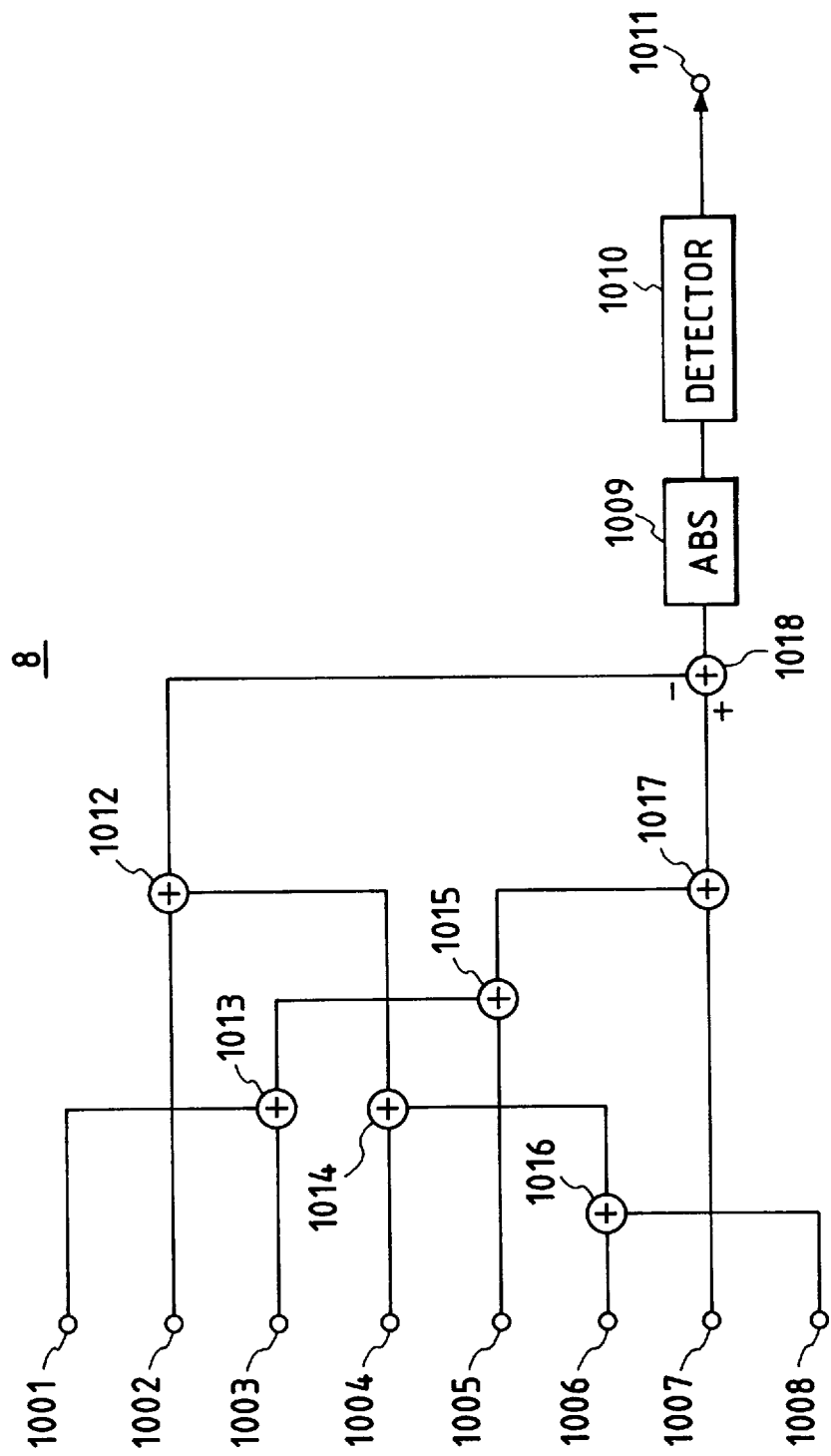

ORTHOGONAL CONVERTING APPARATUS

BACKGROUND OF THE INVENTION

1. Field of the Invention

The present invention relates to an orthogonal converting apparatus which is used for a high efficient encoding of a video signal or the like.

2. Related Background Art

Hitherto, as a method of high efficient encoding an image or a voice, an orthogonal converting process such as a discrete cosine transformation (DCT) or the like has been known.

FIG. 1 shows a two-dimensional DCT processing circuit for an input signal comprising a block of (8×8) pixels. The DCT processing circuit is constructed by two one-dimensional DCT circuits for eight input signals and a transposition circuit. Since a processing time of the one-dimensional DCT circuit is especially long, some high speed algorithms have been considered. FIG. 2 shows an example of a one-dimensional DCT using a known high speed algorithm. In such a DCT, a symmetry of a transforming equation of the DCT is utilized, the addition and subtraction are preliminarily symmetrically executed to input signals and the results are combined, thereby reducing the number of multiplications to half of the number.

A high speed algorithm using a butterfly method such as an FFT is also widely known. In this algorithm, common portions included in the transforming equation of the DCT are combined, thereby further reducing the number of multiplications. Since many of the apparatuses using the high speed algorithm have, however, a large circuit scale, it has been pointed out that they are unsuitable for an application to formation of an LSI or the like.

A system in which the signal converted by the DCT is weighted by using visual sense characteristics such that the human eyesight is dull to high frequencies is also generally used. In such a system, an encoding efficiency is often intended to be raised by largely weighting a signal indicative of low frequencies and slightly weighting a signal indicative of high frequencies. FIGS. 3A and 3B show examples of a 2-dimensional DCT in which a weighting process is performed. FIG. 3A shows the example in which the weighting process is executed after the ordinary 2-dimensional DCT. FIG. 3B shows the example in which the weighting process is executed every 1-dimensional DCT. A method of using both of the DCT and multipliers for weighting is well known and is shown in Japanese Patent Laid-Open Application No. 2-116969.

On the other hand, in a highly efficient encoding of a TV video signal or the like in which an input signal is constructed by two fields having a time deviation, an idea such that a motion between the fields is detected and a method of the DCT is switched is widely used. FIG. 4 shows one example of such a method. Before executing a DCT process, a motion information signal is supplied from a motion detection circuit (not shown) to a DCT circuit, and in accordance with the presence or absence of the motion, a DCT method is switched to either one of a method of performing an ordinary 2-dimensional DCT to (8×8) input signals and a method of dividing the input signals into two sets of (4×8) input signals comprising the addition and subtraction between the fields and performing the 2-dimensional DCT to each set.

In the conventional DCT circuit, as mentioned above, there is a problem of an increase in circuit scale because of the idea of improving the high processing speed and high efficiency. Especially, in an application such that both of the DCT and an IDCT which is an inverse transformation of the DCT are necessary, there is a problem such that the circuit scale further increases and it is difficult to form an LSI.

SUMMARY OF THE INVENTION

The invention is made to solve the above-mentioned problems and an object of the invention is to obtain an orthogonal converting apparatus which can execute a process at a high speed and also can reduce a circuit scale.

According to an embodiment of the invention, there is provided an orthogonal converting apparatus comprising: addition-subtraction operation means for calculating the addition and difference between two signal trains each consisting of (n) (n≧1) signals; two multiplication-addition operation means each for calculating multiplication-addition of the (n) signals; a transposition circuit for permutating (2n×2n) signals arranged in the horizontal and vertical directions; and control means for controlling an operation of each of the above-mentioned means, wherein the control means executes the following processes by controlling the operations of the above-mentioned means: a first encoding process for executing a 2-dimensional orthogonal converting process to the (2n×2n) input signals; a first decoding process corresponding to the first encoding process; a second encoding process for separating the (2n×2n) input signals into (n×2n) signals each corresponding to an addition of adjacent lines and, likewise (n×2n) signals each corresponding to a subtraction of adjacent lines and performing the 2-dimensional orthogonal converting process; and a second decoding process corresponding to the second encoding process.

According to another embodiment of the invention, there is provided an orthogonal converting apparatus comprising: addition-subtraction operation means for calculating the addition and difference between two signal trains each consisting of (n) (n≧1) signals; two multiplication-addition operation means each for calculating multiplication-addition of the (n) signals; a transposition circuit for permutating (2n×2n) signals arranged in the horizontal and vertical directions; weighting means for multiplying predetermined coefficients to the (n) signals, respectively; and control means for controlling an operation of each of the above-mentioned means, wherein the control means performs the following processes by controlling the foregoing means: a first encoding process for executing a weighted 2-dimensional orthogonal converting process to the (2n×2n) input signals; a first decoding process corresponding to the first encoding process; a second encoding process for separating the (2n×2n) input signals into (n×2n) signals each corresponding to an addition of adjacent lines and, likewise (n×2n) signals each corresponding to a subtraction of adjacent lines and performing the weighted 2-dimensional orthogonal converting process; and a second decoding process corresponding to the second encoding process.

According to still another embodiment of the invention, there is provided an orthogonal converting apparatus for forming addition components and difference components between two signal trains and executing a 2-dimensional orthogonal converting process to those components, comprising: first multiplication-addition operation means for calculating multiplication-addition between the addition components and predetermined coefficients; second multiplication-addition operation means for calculating multiplication-addition between the difference components and predetermined coefficients; transposition means for permutating the signals; and control means for controlling an operation of each of the above-mentioned means, wherein the control means executes a 2-dimensional orthogonal converting process by using each of the above-mentioned means in accordance with a predetermined sequence.

According to the foregoing embodiment, since constructional circuits can be commonly used in the DCT and IDCT processes, the circuit scale of the apparatus can be remarkably reduced.

An orthogonal converting apparatus according to another embodiment comprises: multiplication-addition operation means constructed by a butterfly circuit for calculating addition components; and multiplication-addition operation means constructed by a coefficient unit for calculating difference components and a switching unit.

In an orthogonal converting method according to still another embodiment, the addition components are weighted in a step of the orthogonal converting process and the difference components are weighted out of the orthogonal converting process.

According to the orthogonal converting apparatus of the another embodiment mentioned above, the respective multiplication-addition operations of the addition components and difference components in the known high speed algorithm for dividing the input signal train into the addition components and difference components of the symmetrical elements are executed by circuits of different constructions, so that the multiplication-addition operation circuits for respectively executing the DCT and the IDCT can be partially commonly used and the circuit scale of the apparatus can be reduced.

According to the orthogonal converting method of the still another embodiment mentioned above, the respective multiplication-addition operations and weighting operations of the addition components and difference components in the known high speed algorithm for dividing the input signal train into the addition components and difference components of the symmetrical elements are executed by the different methods, so that the multiplication-addition operation circuits for respectively executing the DCT and IDCT can be partially commonly used, so that the circuit scale of the apparatus can be reduced.

An orthogonal converting apparatus according to further another embodiment comprises: first orthogonal converting means for executing a one-dimensional orthogonal converting process to an input signal in a predetermined direction; motion detecting means for detecting motion information of the input signal from transformation coefficients obtained from the first orthogonal converting means; and second orthogonal converting means for executing the one-dimensional orthogonal converting process to the transformation coefficients supplied from the first orthogonal converting means in the direction opposite to the above predetermined direction.

According to further another embodiment, the motion detecting process is included in the orthogonal converting process such as a 2-dimensional discrete cosine transformation or the like, and the transformation coefficients such as DCT coefficients in the 2-dimensional discrete cosine transformation processing step are used for motion detection, so that a high processing speed can be realized and the circuit scale can be reduced.

The above and other objects and features of the present invention will become apparent from the following detailed description and the appended claims with reference to the accompanying drawings.

BRIEF DESCRIPTION OF THE DRAWINGS

FIG. 9 is a constructional diagram showing states in every cycle of a switching unit in FIG. 8;

FIG. 10 is a block diagram showing an embodiment of a multiplication-addition operation circuit 5 in the apparatus of FIG. 5;

FIG. 11 is a constructional diagram showing states in every cycle of a switching unit in FIG. 10;

FIG. 14 is a block diagram showing an embodiment of a motion detection circuit 8 in the apparatus of FIG. 5.

DETAILED DESCRIPTION OF THE PREFERRED EMBODIMENTS

Figure 1:
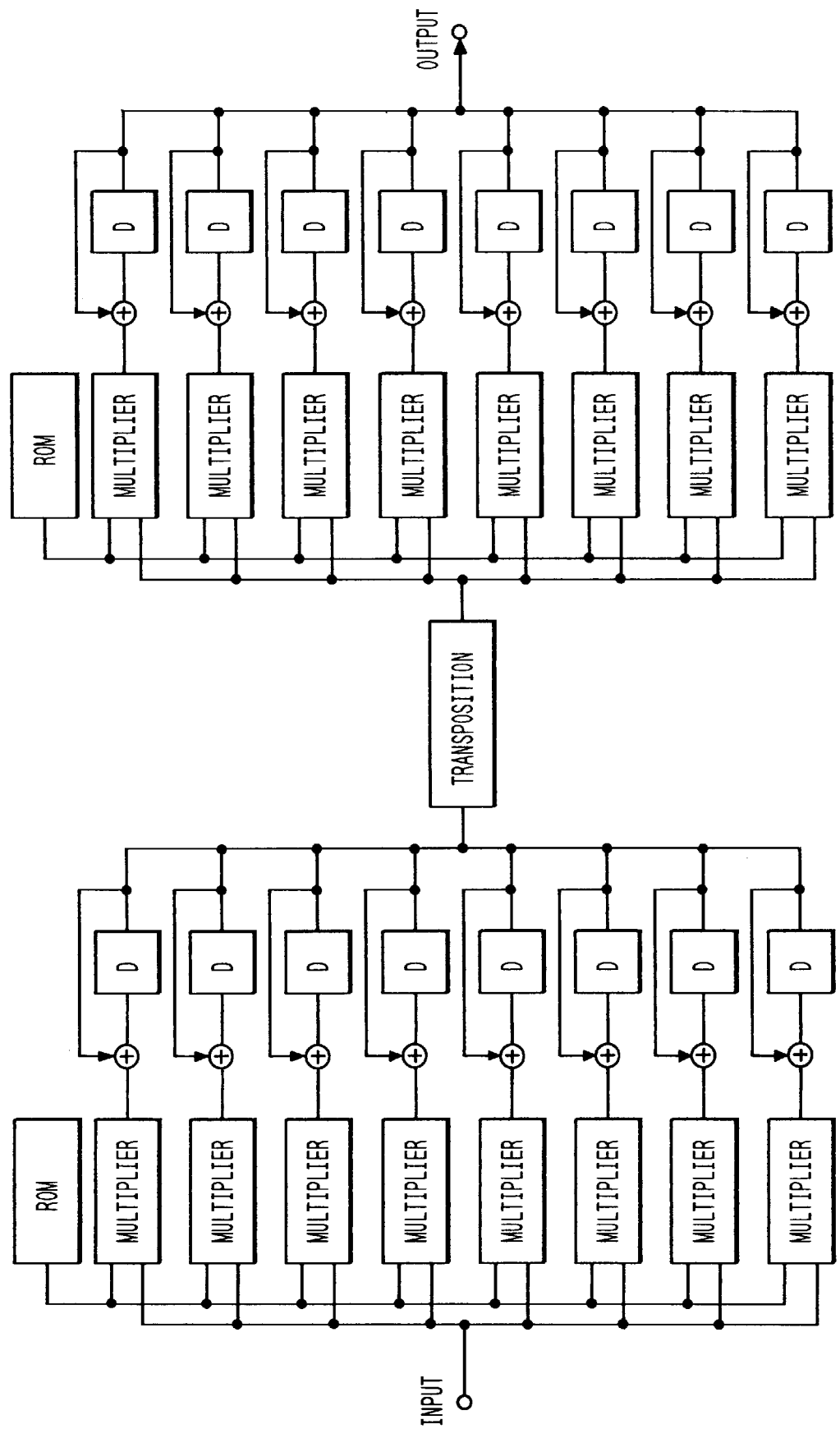
FIG. 1 is a block diagram showing a circuit.
Figure 2:
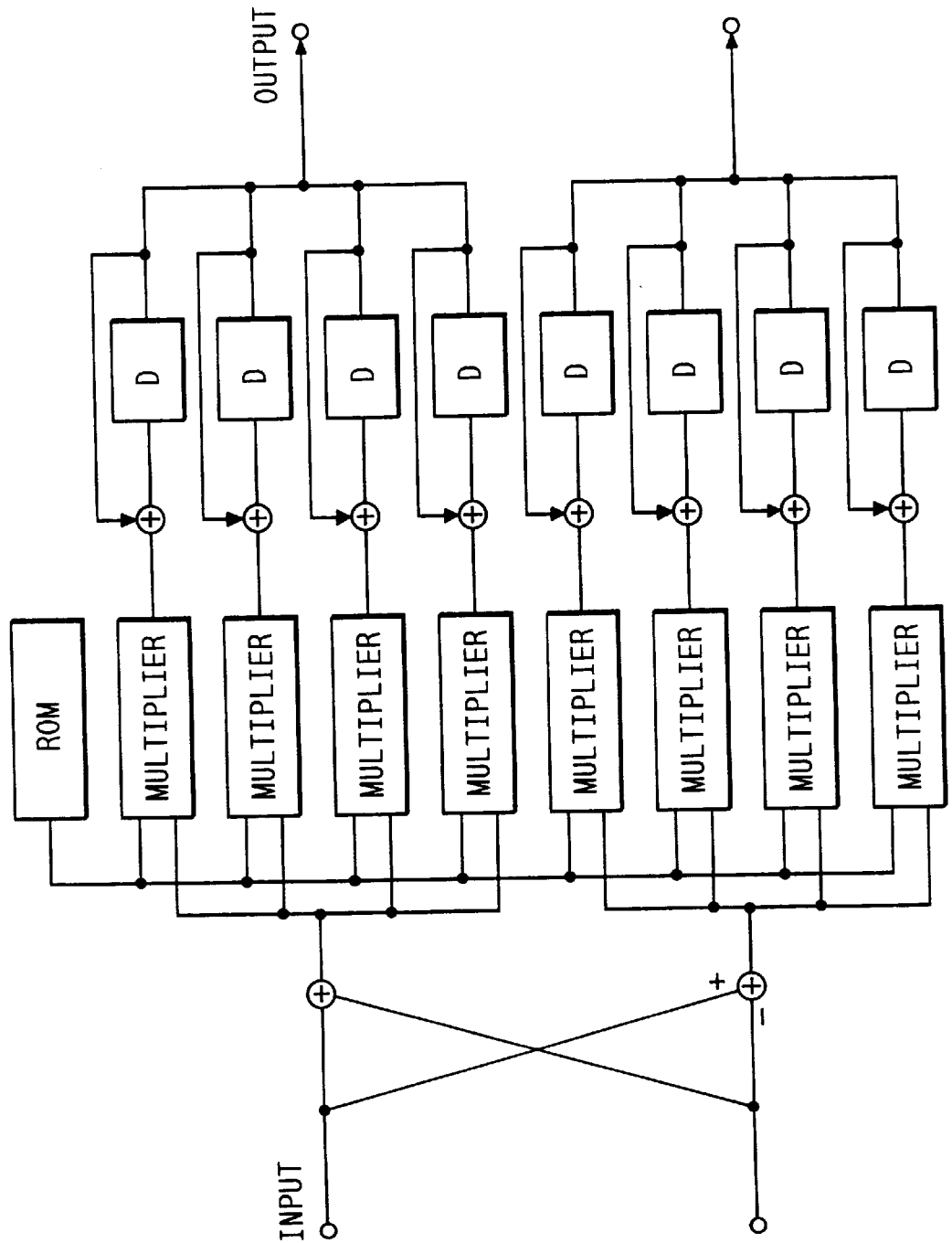
FIG. 2 is a block diagram showing a circuit by a high speed algorithm.
Figure 3A:
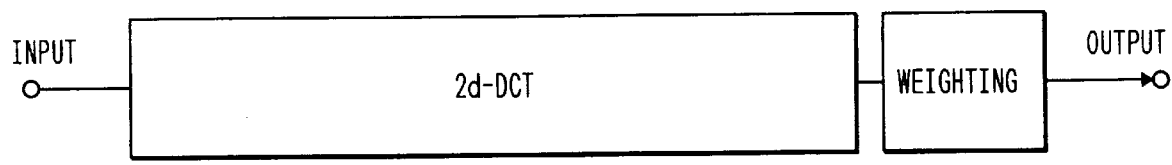
FIGS. 3A and 3B are block diagrams showing weighting operations.
Figure 3B:
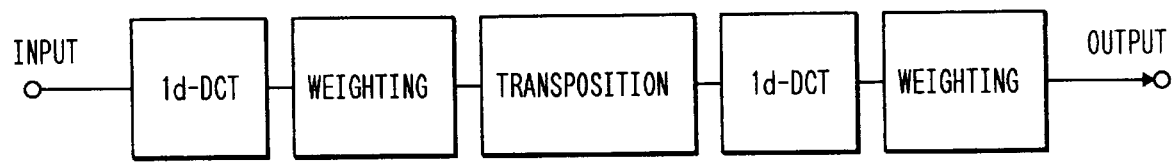
Figure 4:
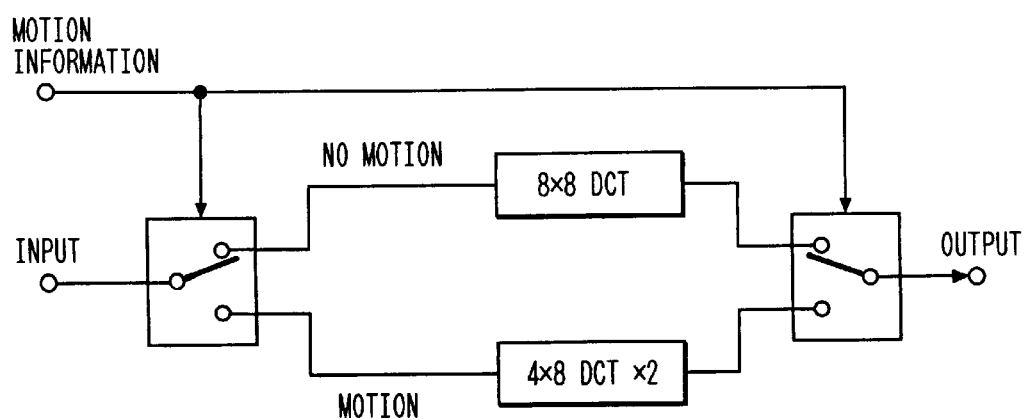
FIG. 4 is a block diagram showing a circuit corresponding to motion information.
Figure 5:
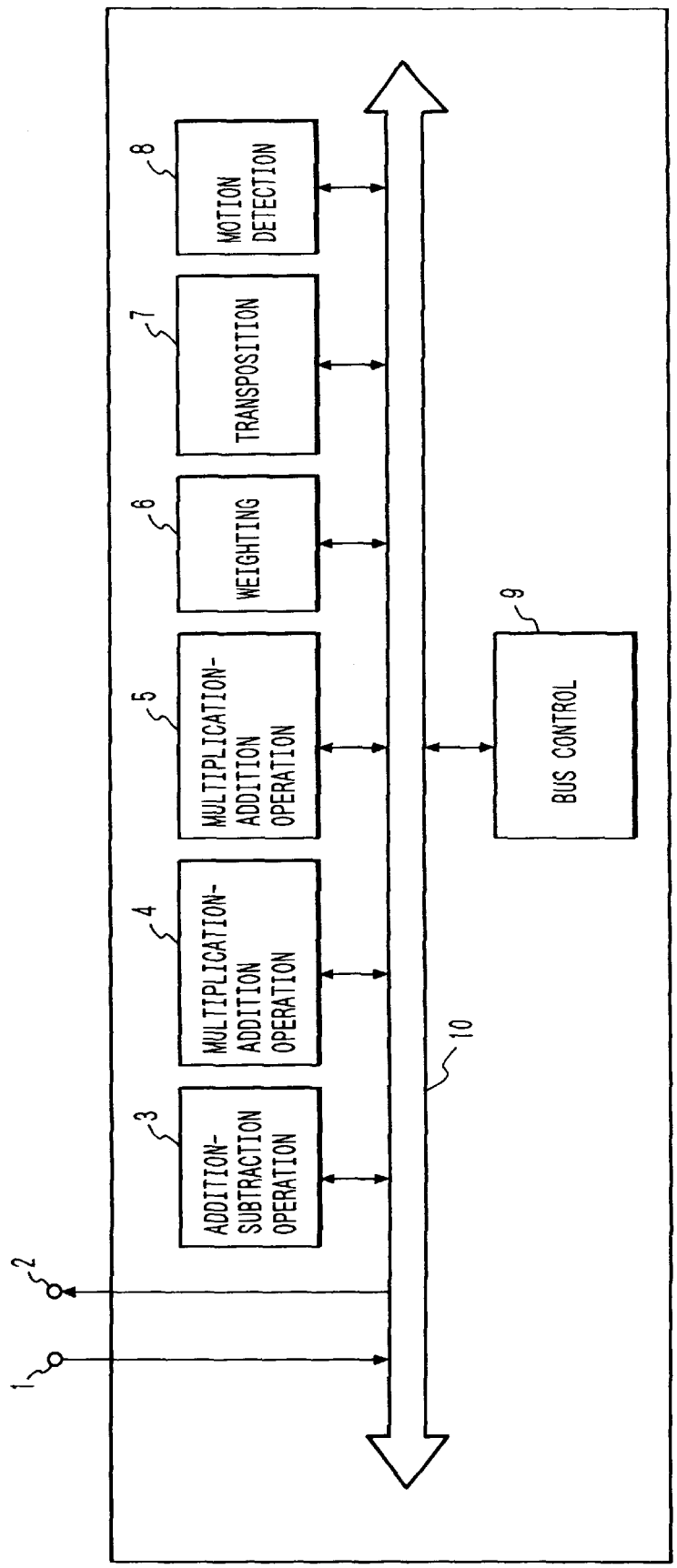
FIG. 5 is a block diagram showing an embodiment of the invention.

FIG. 5 is a block diagram showing an embodiment of an orthogonal converting apparatus of the invention and shows an example in the case where an input signal comprising (8×8) pixels is subjected to a two-dimensional DCT.

Figure 6:
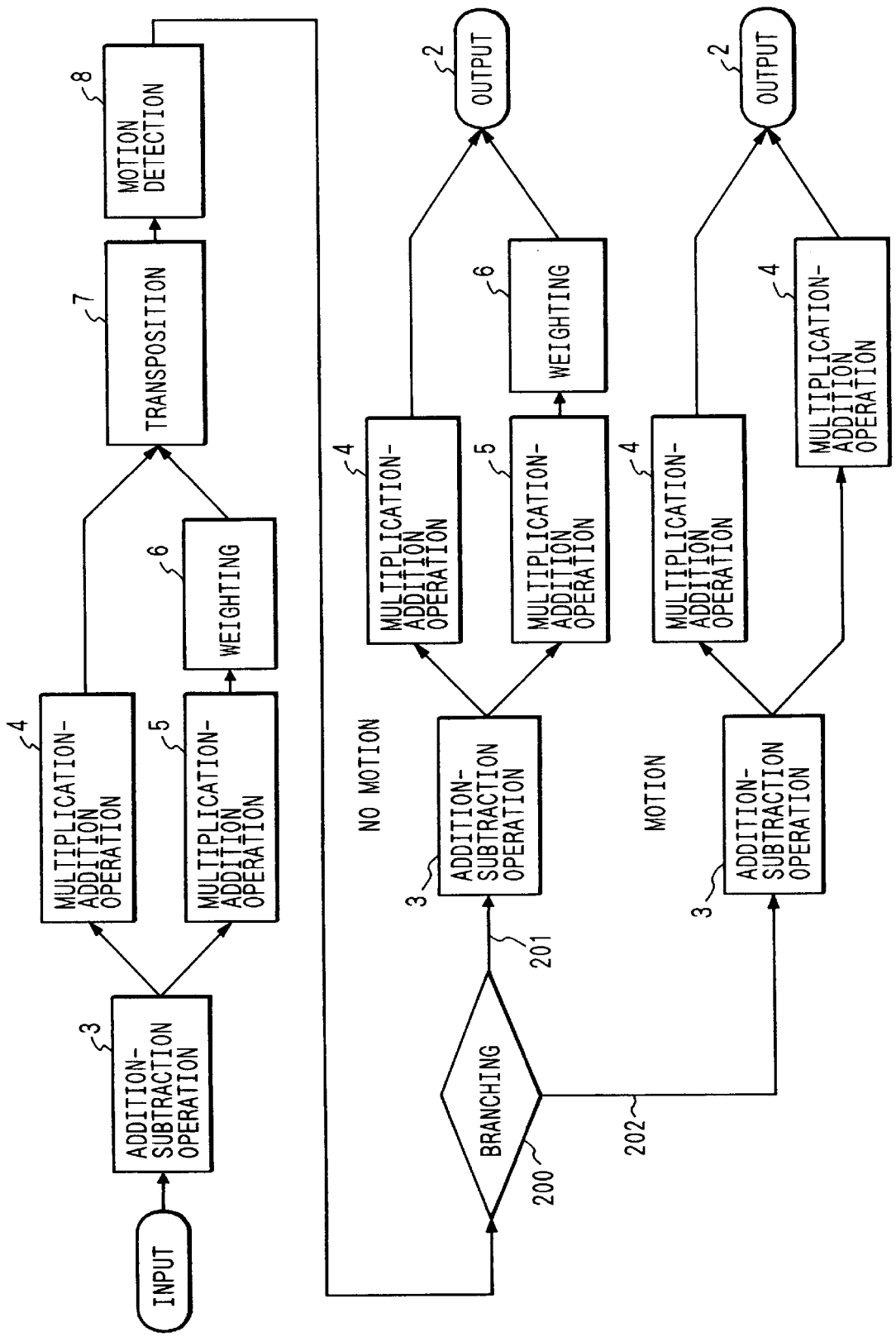
FIG. 6 is a flowchart of a DCT by an apparatus of FIG. 5.

FIG. 6 is a flowchart showing processing steps of a DCT according to the embodiment.

In FIGS. 5 and 6, the apparatus has a construction such that an input terminal 1, an output terminal 2, and circuits 3 to 8 to execute processes such as addition-subtraction operations, a multiplication-addition operation, a weighting process, a transposition, a motion detection, and the like are connected by a bus 10. A bus control circuit 9 controls a flow of data on the bus 10, transmits/receives control signals to/from the above-mentioned circuits 3 to 8, controls a switching operation of operation states, and executes processes in accordance with the flowchart shown in FIG. 6.

Figure 7:
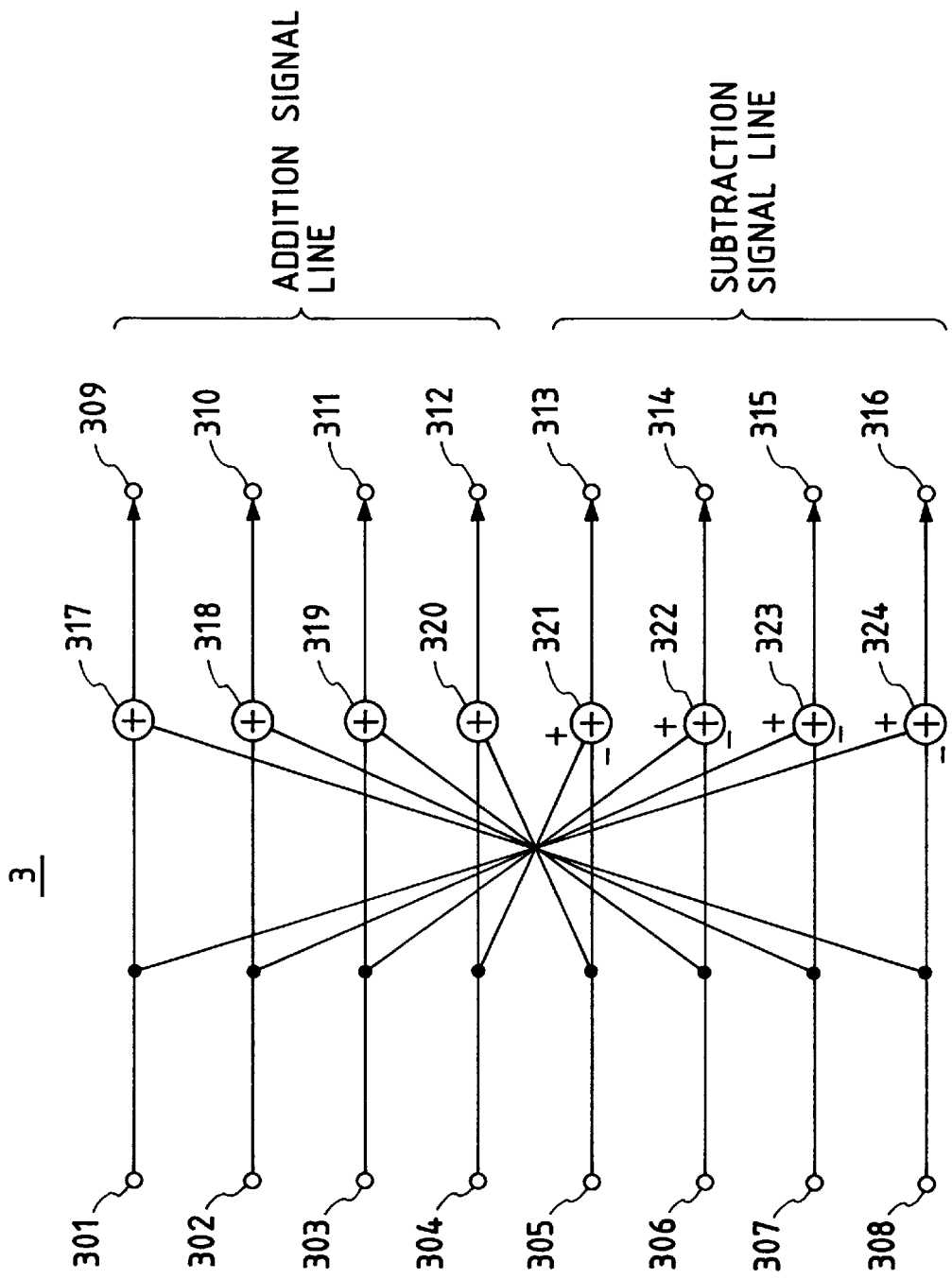
FIG. 7 is a block diagram showing an embodiment of an addition-subtraction operation circuit 3 in the apparatus of FIG. 5.

A signal of one line (8pixels) is fetched from the input terminal 1 and is supplied to the addition-subtraction operation circuit 3 through the bus 10. FIG. 7 shows an embodiment of the addition-subtraction operation circuit 3. In FIG. 7, additions between the symmetrical elements of the signals supplied to terminals 301 to 308 through the bus 10 are outputted to terminals 309 to 312 from adders 317 to 320. Differences between the symmetrical elements are outputted to terminals 313 to 316 from subtracters 321 to 324. The addition signal train outputted to the terminals 309 to 312 by the addition-subtraction operation circuit 3 is supplied to the multiplication-addition operation circuit 4 by the bus control circuit 9. Similarily, the subtraction signal train outputted to the terminals 313 to 316 by the addition-subtraction operation circuit 3 is supplied to the multiplication-addition operation circuit 5 by the bus control circuit 9.

Figure 8:
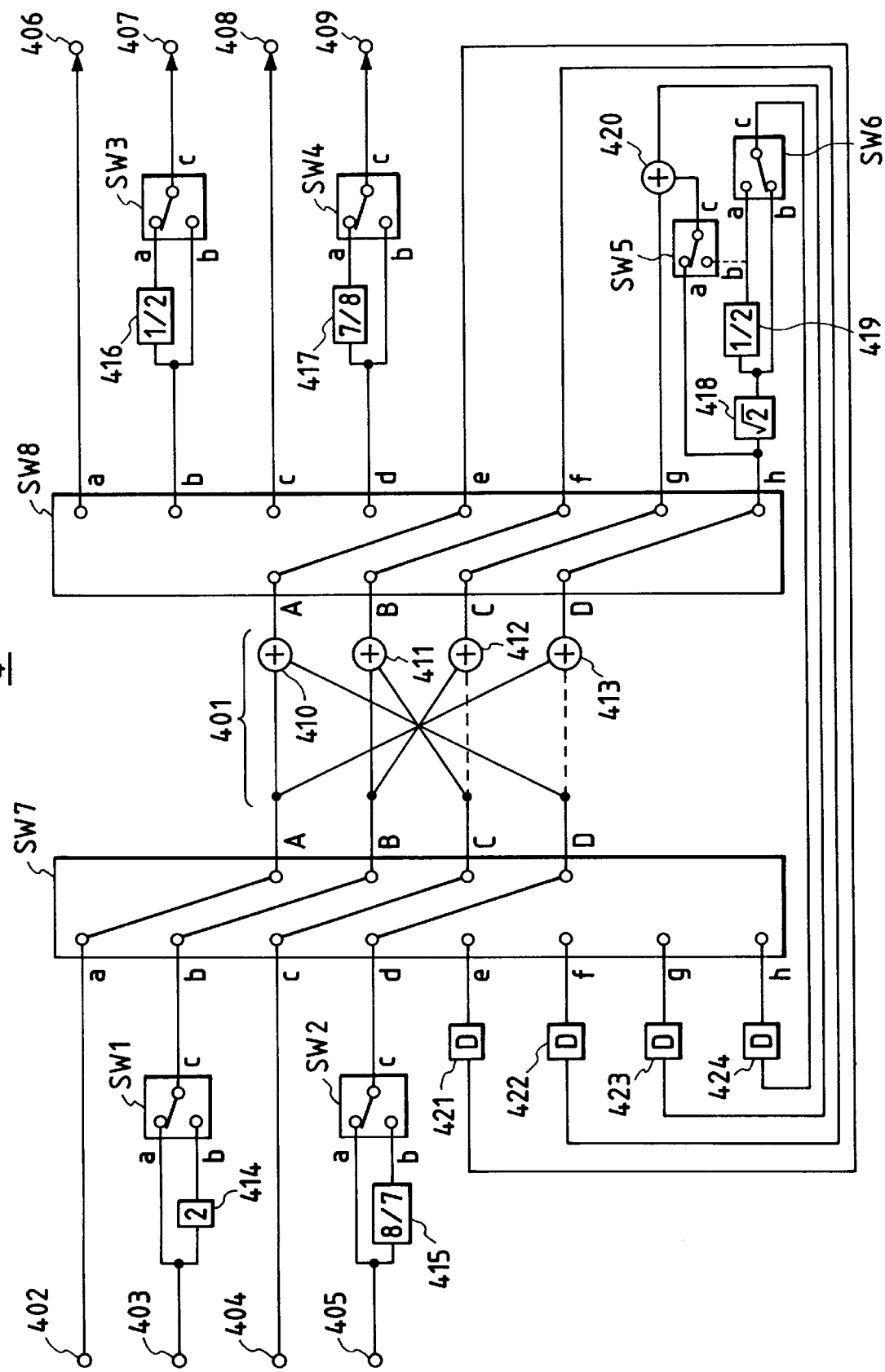
FIG. 8 is a block diagram showing an embodiment of a multiplication-addition operation circuit 4 in the apparatus of FIG. 5.

An embodiment of the multiplication-addition operation circuit 4 is shown in FIG. 8. According to the embodiment, as shown in the diagram, the multiplication-addition operation circuit 4 corresponds to both of the DCT and IDCT processes and is constructed by: a set of 4-point butterfly arithmetic operating unit 401 including adders 410 to 413; coefficient units 414 to 419; switching units sw1 to sw8; an adder 420; and delay circuits 421 to 424. In FIG. 8, each of the coefficient units 414 to 419 multiplies a numeral shown in each circuit. A broken line indicates the inversion of a sign. In the multiplication-addition operation circuit 4, signals supplied to terminals 402 to 405 are processed in two cycles and outputted to terminals 406 to 409. FIG. 9 shows states of the switching units sw1 to sw8 in each cycle when the circuit 4 executes the DCT and IDCT processes.

On the other hand, FIG. 10 shows an embodiment of the multiplication-addition operation circuit 5. In FIG. 10, in the multiplication-addition operation circuit 5, the subtraction signal train supplied to a terminal 601 is serially supplied to coefficient units 602 to 605 in four cycles. The coefficient units 602 to 605 multiply the supplied signal by predetermined coefficients k1 to k4, respectively. The multiplication results and the signals obtained by inverting the signs of the multiplication results as shown by broken lines are supplied to a switching unit 606. The switching unit 606 switches the supplied signal in respective cycles and supplies to multiplication calculation circuits 607 to 610.

FIG. 11 shows a state of the switching unit 606 in each cycle. In the switching unit 606, the states of the cycles in the DCT and IDCT are the same. The multiplication calculation circuits 607 to 610 multiply the signal supplied in four cycles and output the results to terminals 611 to 614.

Figure 12:
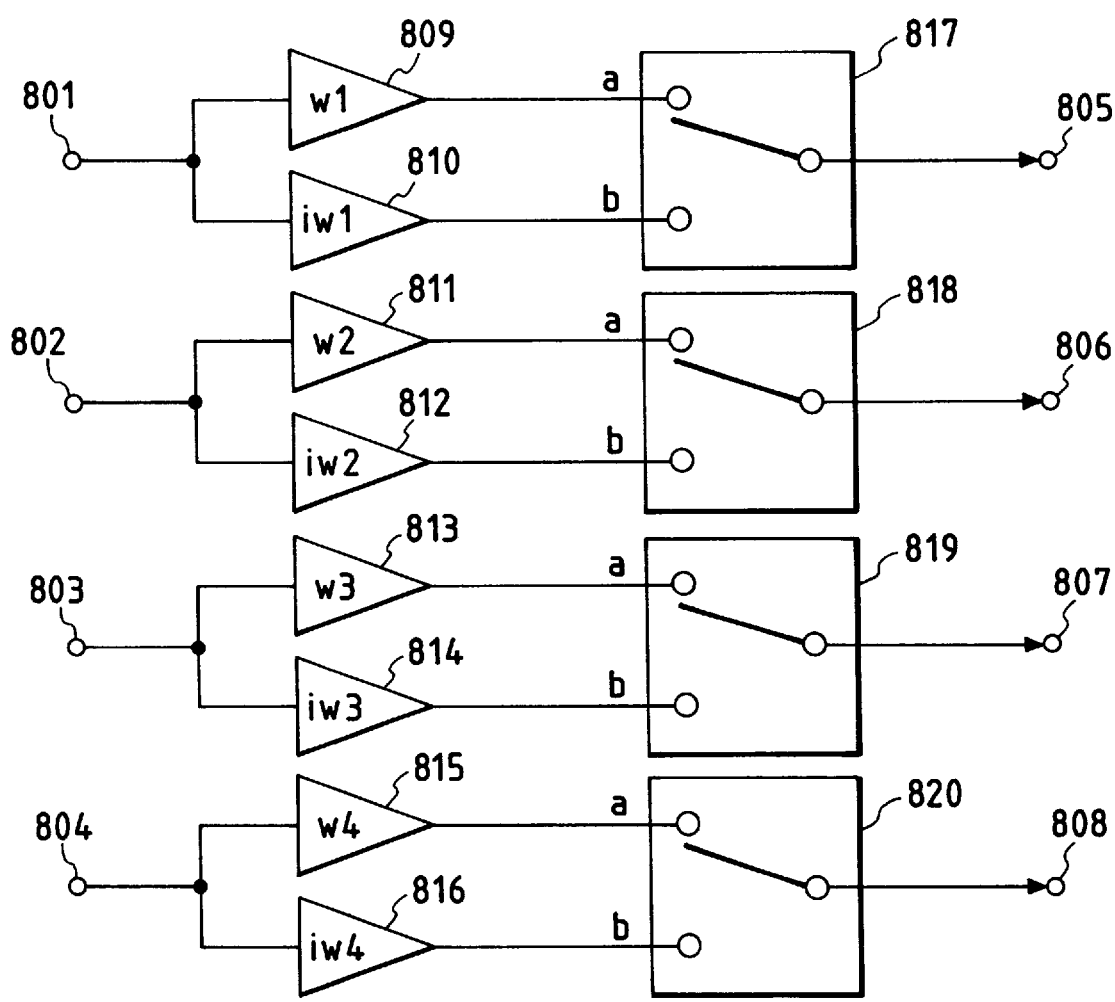
FIG. 12 is a block diagram showing an embodiment of a weighting circuit 6 in the apparatus of FIG. 5.

The signals transmitted to the terminals 611 to 614 are supplied to the weighting circuit 6. FIG. 12 shows an embodiment of the weighting circuit 6. In the weighting circuit 6 of FIG. 12, the signals supplied to terminals 801 to 804 are multiplied by predetermined coefficients and are outputted to terminals 805 to 808. In FIG. 12, reference numerals 809 to 816 denote coefficient units for multiplying coefficients (w1, iw1) to (w4, iw4), respectively. Reference numerals 817 to 820 indicate switching units. The switching units 817 to 820 select an (a) side in the DCT process and select a (b) side in the IDCT process.

Figure 13B:
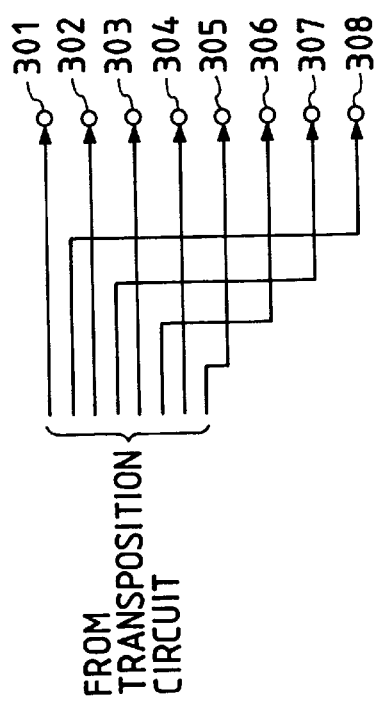
FIGS. 13A to 13D are constructional diagrams showing orders of permutating signals of a bus control circuit 9 in the apparatus of FIG. 5.
Figure 13D:
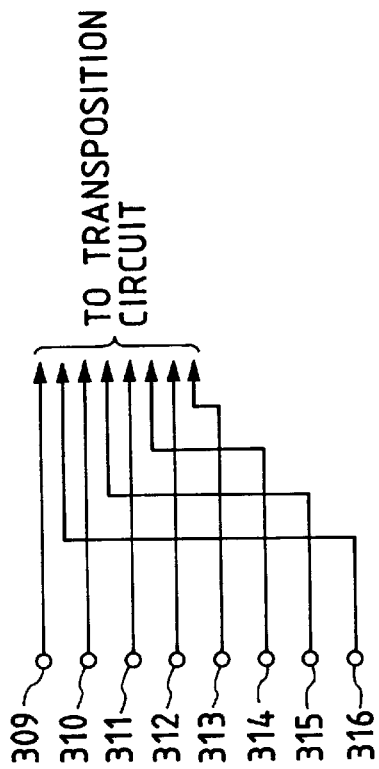
Figure 13A:
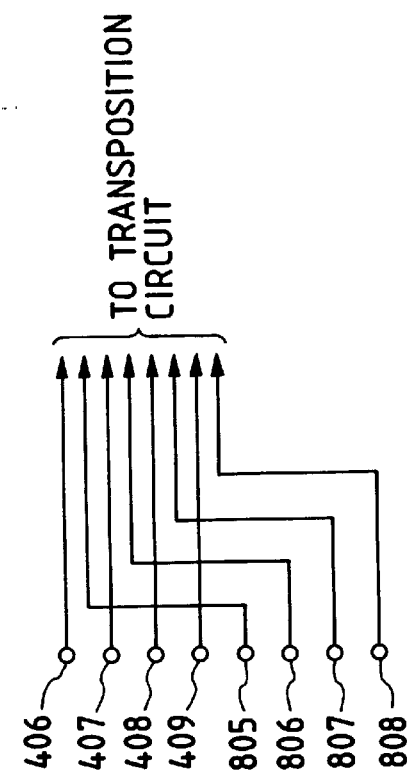

Outputs of the multiplication-addition operation circuit 4 and weighting circuit 6 are supplied to the transposition circuit 7. In this instance, the bus control circuit 9 permutates the signal train from the multiplication-addition operation circuit 4 and the signal train from the weighting circuit 6 as shown in FIG. 13A and supplies. The transposition circuit 7 holds the above-mentioned processing results regarding the (64) input signals of eight lines and, after that, transpositions them.

The motion detection circuit 8 detects motion information in the input signals from the signals stored in the transposition circuit 7. FIG. 14 shows an embodiment of the motion detection circuit 8. In FIG. 14, the motion detection circuit 8 receives a DC component train from the transposition circuit 7. The DC component train is constructed by DC components of respective lines. In the motion detection circuit 8, the DC component train supplied to terminals 1001 to 1008 is divided into an odd-number line train and an even-number line train. The sums of the respective trains are obtained by adders 1012 to 1017. After that, a difference of the sums is calculated by a subtracter 1018, the absolute value of the difference is obtained by an absolute value unit 1009 and is supplied to a detector 1010. The detector 1010 compares the supplied value with a constant "256" and outputs a motion information signal indicative of no motion when the supplied value is smaller than 256 and indicative of the presence of a motion when the value is equal to or larger than 256 to a terminal 1011.

The motion information signal is outputted from the output terminal 2 in FIG. 5 and is supplied to the bus control circuit 9, thereby determining the subsequent processing method. The motion information signal can be also supplied from the outside without providing the motion detection circuit 8. In case of no motion, the bus control circuit 9 gives processing steps similar to those of the signal train from the input terminal 1 in FIG. 5 to every eight signals supplied from the transposition circuit 7. That is, the signal is processed in a flow from a branching block 200 in FIG. 6 to the addition-subtraction operation circuit 3 through a branching path 201 side and is sequentially outputted from the output terminal 2. When there is the motion, the signal is processed in a flow from the branching block 200 in FIG. 6 to the addition-subtraction operation circuit 3 through a branching bath 202 side. In this case, the bus control circuit 9 permutates every eight signals outputted by the transposition circuit 7 as shown in FIG. 13B and supplies to the addition-subtraction operation circuit 3.

In case of no motion, the addition signal train outputted by the addition-subtraction operation circuit 3 is supplied to the multiplication-addition operation circuit 4, is likewise subjected to processes similar to the above-mentioned processes in two cycles, and is similarity processed by the multiplication-addition operation circuit 5 and weighting circuit 6. The respective processing results are outputted from the output terminal 2. When there is the motion; the subtraction signal train outputted by the addition-subtraction operation circuit 3 is supplied to the multiplication-addition operation circuit 4 in a manner similar to the addition signal train. In case of constructing the multiplication-addition operation circuit 4 as shown in the embodiment of FIG. 8, since the processing time is short, even when the processes for the addition signal train and subtraction signal train are sequentially serially executed, the processes can be executed within a time corresponding to the addition of the processing times of the multiplication-addition operation circuit 5 and weighting circuit 6. The subtraction signal train processed by the multiplication-addition operation circuit 4 is outputted from the output terminal 2.

Figure 15:
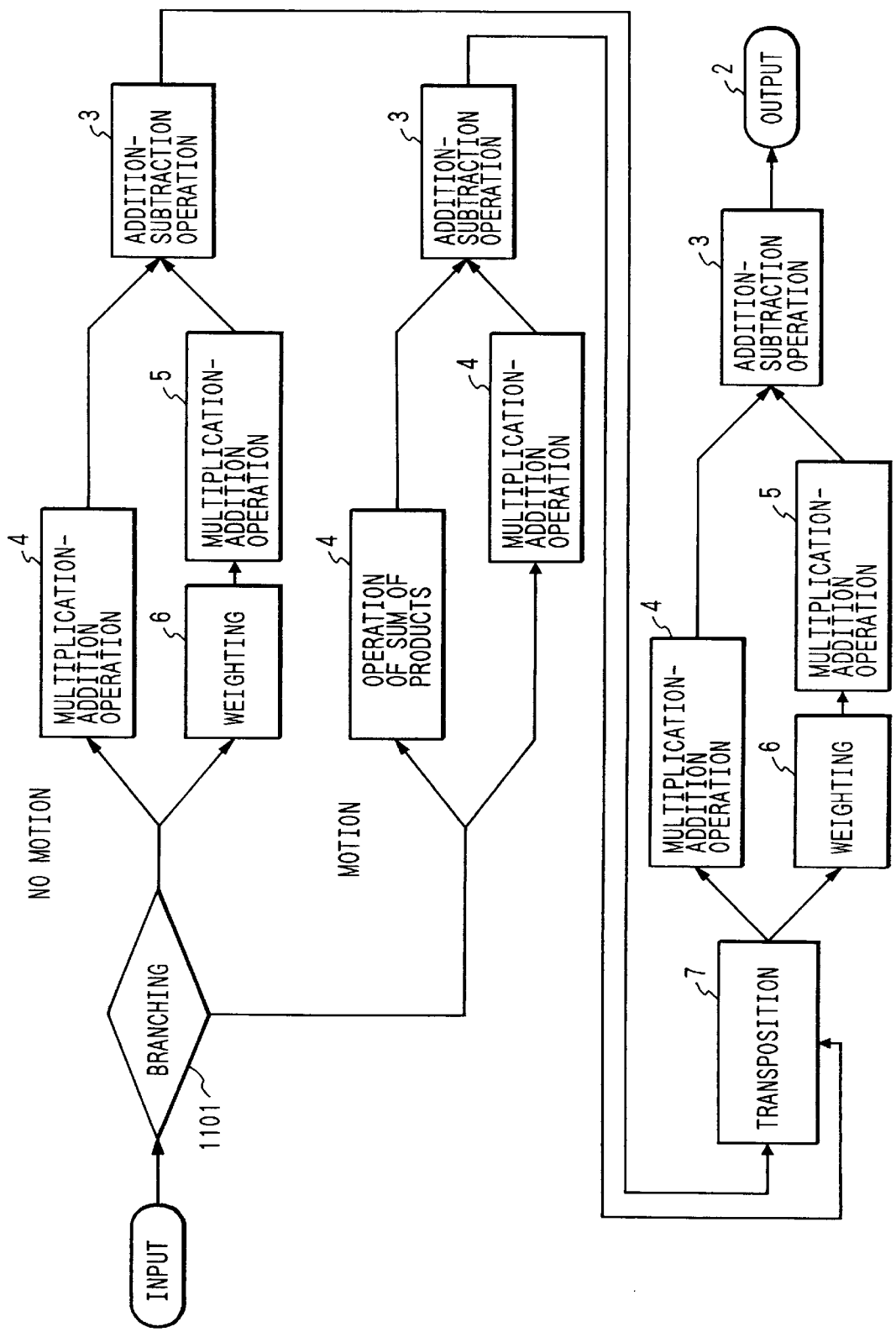
FIG. 15 is a flowchart of an IDCT by the apparatus of FIG. 5.

FIG. 15 is a flowchart showing IDCT processing steps according to the embodiment of FIG. 5. In FIGS. 5 and 15, the motion information signal is supplied to the input terminal 1 prior to a DCT coefficient train. When the motion information signal shows no motion, the bus control circuit 9 divides every eight DCT coefficient trains supplied from the input terminal 1 into four odd-number designated signal trains and four even-number designated signal trains through the branching block 1101 and supplies the odd number signal trains to the multiplication-addition operation circuit 4 and supplies the even number signal trains to the weighting circuit 6. The weighting circuit 6 multiplies the supplied signals by predetermined coefficients at the time of the IDCT. In the embodiment of the weighting circuit 6 of FIG. 12, the switching units 817 to 820 are switched to the (b) side in this instance. The arithmetic operation results of the weighting circuit 6 are supplied to the multiplication-addition operation circuit 5. When the multiplication-addition operation circuit 4 is constructed as shown in the embodiment of FIG. 8, the switching units sw1 to sw8 are selected in accordance with FIG. 9 and the processes are executed in two cycles. When the multiplication-addition operation circuit 5 is constructed as shown in the embodiment of FIG. 10, the switching unit 606 is selected in accordance with FIG. 11 and the processes are executed in four cycles.

Figure 13C:
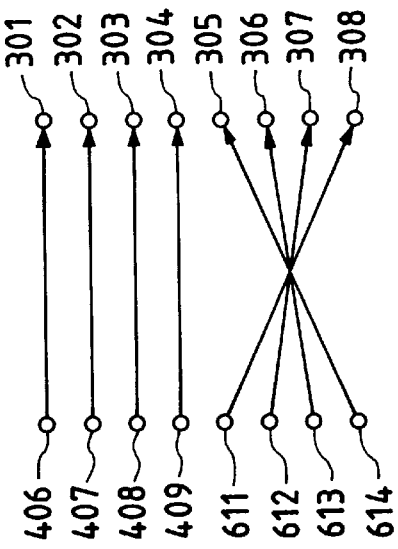

The processing results of the multiplication-addition operation circuits 4 and 5 are supplied to the addition-subtraction operation circuit 3 through the bus. In this instance, the bus control circuit 9 permutates the signals as shown in FIG. 13C and supplies to the addition-subtraction operation circuit 3 from the output terminals 301 to 308. As shown in the embodiment of FIG. 7, the addition-subtraction operation circuit 3 symmetrically adds or subtracts the supplied signals and the results are supplied to the transposition circuit 7.

On the other hand, when the motion information signal shows the presence of the motion, the bus control circuit 9 divides the signals supplied to the input terminal 1 every eight signals into four signals as a first half signal train and four signals as a latter half signal train through the branching block 1101 and sequentially supplies to the multiplication-addition operation circuit 4. The first half and latter half signal trains processed by the multiplication-addition operation circuit 4 are permutated by the bus control circuit 9 as shown in FIG. 13C and are supplied to the addition-subtraction operation circuit 3.

The addition-subtraction operation circuit 3 symmetrically executes the addition and subtraction to the supplied signals as shown in the embodiment of FIG. 7. The bus control circuit 9 permutates the outputs of the addition-subtraction operation circuit 3 as shown in FIG. 13D and supplies to the transposition circuit 7. Subsequent processes are substantially the same irrespective of the motion information signal. The transposition circuit holds the 64 signals in a buffer and, after that, transpositions and outputs every eight signals. The every eight signals are processed in a manner similar to the above-mentioned processes of the DCT coefficient train in case of no motion in FIG. 6 and are sequentially outputted from the output terminal 2.

In the embodiment, in both of the processing steps of FIGS. 6 and 15, the addition-subtraction operation circuit 3, multiplication-addition operation circuits 4 and 5, weighting circuit 6, and transposition circuit 7 are commonly used. That is, the circuits 3 to 8 in FIG. 5 can be commonly used also in FIGS. 6 and 15.

As mentioned above, according to the foregoing embodiment, while using the algorithm formed so as to improve the high processing speed and high efficiency, the constructional circuits can be commonly used in the DCT and IDCT processes in the case where the weighting operation is executed or the case where it is not performed, so that there is an effect that the circuit scale of the apparatus can be remarkably reduced.

According to the above-mentioned embodiment, the motion detecting process is included in the orthogonal converting process such as a 2-dimensional discrete cosine transformation or the like and the transformation coefficients in the 2-dimensional discrete cosine transformation processing step are used for motion detection. By using such a construction, there is an effect such that the high processing speed can be realized and the circuit scale can be reduced.

According to the embodiment as mentioned above, further, the multiplication-addition operations of the addition components and difference components in the known high speed algorithm for dividing the input signal train into the addition components and difference components of the symmetrical elements is executed by the multiplication-addition operation means of different constructions, so that the multiplication-addition operation circuits for respectively executing the DCT and the IDCT can be partially commonly used. There are effects such that the circuit scale of the apparatus can be reduced and the high processing speed can be realized.

The respective multiplication-addition operations and the weighting operations of the addition components and difference components in the known high speed algorithm for dividing the input signal train into the addition components and difference components of the symmetrical elements are executed by the different methods, so that the multiplication-addition operation circuits for respectively executing the DCT and the IDCT can be partially commonly used. There are effects such that the circuit scale can be reduced and the high processing speed can be realized.

What is claimed is:

1. An orthogonal converting apparatus comprising:
   addition-subtraction operation means for calculating the addition and difference between two signal trains each consisting of n signals (n≧1);
   two multiplication-addition operation means each for calculating multiplication-addition of the n signals;
   transposition means for permutating (2n×2n) signals arranged in the horizontal and vertical directions; and
   control means for controlling an operation of each of said means so as to execute one of the following different processes:
   a first encoding process for executing a dimensional orthogonal converting process on the (2n×2n) input signals;
   a first decoding process corresponding to said first encoding process;
   a second encoding process for dividing the (2n×2n) input signals into (n×2n) signals each corresponding to an addition of adjacent lines and, likewise (n×2n) signals each corresponding to a subtraction of adjacent lines and performing the 2-dimensional orthogonal converting process; and
   a second decoding process corresponding to said second encoding process.

2. An orthogonal converting apparatus comprising:
   addition-subtraction operation means for calculating the addition and difference between two signal trains each consisting of n signals (n≧1);
   two multiplication-addition operation means each for calculating multiplication-addition of the n signals;
   transposition means for permutating (2n×2n) signals arranged in the horizontal and vertical directions;
   weighting means for multiplying predetermined coefficients with the n signals, respectively; and
   control means for controlling an operation of each of said means so as to execute one of the following different processes:
   a first encoding process for executing a weighted 2-dimensional orthogonal converting process on the (2n×2n) input signals;
   a first decoding process corresponding to said first encoding process;
   a second encoding process for dividing the (2n×2n) input signals into (n×2n) signals each corresponding to an addition of adjacent lines and, likewise (n×2n) signals each corresponding to a subtraction of adjacent lines and performing the weighted 2-dimensional orthogonal converting process; and a second decoding process corresponding to said second encoding process.

3. An orthogonal converting apparatus for forming addition components and difference components between two signal trains and executing a 2-dimensional orthogonal converting process on those components, comprising:

first multiplication-addition operation means for calculating multiplication-addition between the addition components and predetermined coefficients;

second multiplication-addition operation means for calculating multiplication-addition between the difference components and predetermined coefficients;

transposition means for permutating the signals; and control means for controlling an operation of each of said means so as to execute one of the following different processes:

a first encoding process for executing a dimensional orthogonal converting process on (2n×2m) input signals (n, m≧1); and a second encoding process for dividing the (2n×2m) input signals into (n×2m) signals each corresponding to an addition of adjacent lines and, likewise (n×2m) signals each corresponding to a subtraction of adjacent lines and performing the 2-dimensional orthogonal converting process.

4. An orthogonal converting apparatus for dividing 2n input signals $X=(X_0, X_1, \ldots, X_{2n}-1)$ into addition components=$(X_0+X_{2n-1}, X_1+X_{2n-2}, \ldots, X_{n-1}+X_n)$ of symmetrical elements and difference components=$(X_0-X_{2n-1}, X_1-X_{2n-2}, \ldots, X_{n-1}-X_n)$ of said symmetrical elements and processing, comprising:

first multiplication-addition operation means constructed by a butterfly circuit for calculating the addition components; and second multiplication-addition operation means constructed by a coefficient unit for calculating the difference components and a switching unit.

5. An apparatus according to claim 4, wherein said second multiplication-addition operation means for calculating the difference components is commonly used in a DCT and an IDCT and the number of said coefficient units constructing said second multiplication-addition operation means is equal to n.

6. An apparatus according to claim 4, wherein said butterfly circuit constructing said first multiplication-addition operation means for calculating the addition components is commonly used in a DCT and an IDCT.

7. An orthogonal converting method of dividing 2n input signals $X=(X_0, X_1, \ldots, X_{2n}-1)$ into addition components=$(X_0+X_{2n-1}, X_1\pm X_{2n-2}, \ldots, X_{n-1}+X_n)$ of symmetrical elements and difference components=$(X_0-X_{2n-1}, X_1-X_{2n-2}, \ldots, X_{n-1}-X_n)$ of said symmetrical elements and processing the addition and difference components, wherein the addition components divided from the input signals are undergone a first multiplication-addition operation process, and a weighting processing is performed during the first multiplication-addition operation process, wherein the difference components divided from the input signals undergo a second multiplication-addition operation process and weighting processing, and the weighting processing of the difference components is performed during a time other than a time when the second multiplication-addition operation process is performed.

8. A method according to claim 7, wherein the first multiplication-addition operation of the addition components is executed by using a butterfly circuit and the second multiplication-addition operation of the difference components is executed by using a construction of a coefficient unit and a switching unit.

9. A method according to claim 8, wherein the construction of said coefficient unit for calculating the difference components and said switching unit is commonly used in a DCT and an IDCT and the number of said coefficient units is equal to the n.

10. A method according to claim 8, wherein said butterfly circuit for calculating the addition components is commonly used in a DCT and an IDCT.

* * * * *